United States Patent
Stelle, IV et al.

(10) Patent No.: US 12,362,454 B2
(45) Date of Patent: Jul. 15, 2025

(54) TRI-SEGMENTED BASELINE FOR GNSS BASED ANTENNA ALIGNMENT

(71) Applicant: Viavi Solutions Inc., San Jose, CA (US)

(72) Inventors: Raleigh Benton Stelle, IV, Indianapolis, IN (US); Adam Woolsey, Indianapolis, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 17/658,912

(22) Filed: Apr. 12, 2022

(65) Prior Publication Data

US 2023/0327316 A1 Oct. 12, 2023

(51) Int. Cl.
  *H01Q 1/08* (2006.01)
  *G01B 5/25* (2006.01)
  *G01S 19/14* (2010.01)
  *H01Q 1/12* (2006.01)

(52) U.S. Cl.
  CPC ............... *H01Q 1/084* (2013.01); *G01B 5/25* (2013.01); *H01Q 1/125* (2013.01); *G01S 19/14* (2013.01)

(58) Field of Classification Search
  CPC .......... H01Q 1/27; H01Q 1/273; H01Q 1/125; H01Q 1/084; H01Q 1/08; G01S 19/14
  USPC ............... 343/882, 765, 890, 702; 342/359, 342/357.62; 310/46; 29/601
  See application file for complete search history.

(56) References Cited

U.S. PATENT DOCUMENTS

| | | | | |
|---|---|---|---|---|
| 3,934,216 | A * | 1/1976 | Ward | H01F 7/0242 310/46 |
| 5,347,286 | A * | 9/1994 | Babitch | H01Q 1/3275 342/359 |
| 6,897,828 | B2 * | 5/2005 | Boucher | H01Q 1/246 343/890 |
| 8,436,779 | B2 * | 5/2013 | Clifford | H01Q 1/125 343/765 |
| 10,557,723 | B2 * | 2/2020 | Lee | G01D 5/145 |
| 10,677,934 | B2 * | 6/2020 | Vella-Coleiro | G01S 19/55 |
| 2009/0322647 | A1 * | 12/2009 | Shawver | H01Q 1/2216 343/882 |
| 2011/0225804 | A1 * | 9/2011 | Clifford | H01Q 1/1207 269/55 |
| 2014/0049444 | A1 * | 2/2014 | Williams | H01Q 3/06 343/882 |
| 2014/0266925 | A1 * | 9/2014 | Dalmazzo | G01S 19/14 343/702 |

(Continued)

OTHER PUBLICATIONS

MultiWaveSensors. (Smart Aligner User Guide V1.1). Jan. 2015. pp. 1-34. (Year: 2015).*

*Primary Examiner* — Bo Fan
(74) *Attorney, Agent, or Firm* — DLA Piper LLP (US)

(57) ABSTRACT

A global navigation satellite system (GNSS) antenna alignment device may have two movably attached arms to a main housing of the antenna alignment device. Each arm may have a GNSS antenna mounted thereon. The baseline between the GNSS antennas is therefore tri-segmented, with a first arm forming a first segment, a second arm forming a second segment, and the main housing forming a third segment. The length and orientation of the baseline may be adjusted by moving one or more of the first arm and the second arm. Furthermore, the first arm and the second arm may be stowed for a convenient storage and transport.

20 Claims, 6 Drawing Sheets

(56) References Cited

U.S. PATENT DOCUMENTS

2015/0054681 A1* 2/2015 Clifford .................. G01S 19/53
29/601
2020/0271747 A1* 8/2020 Wu ......................... G01P 15/18

* cited by examiner

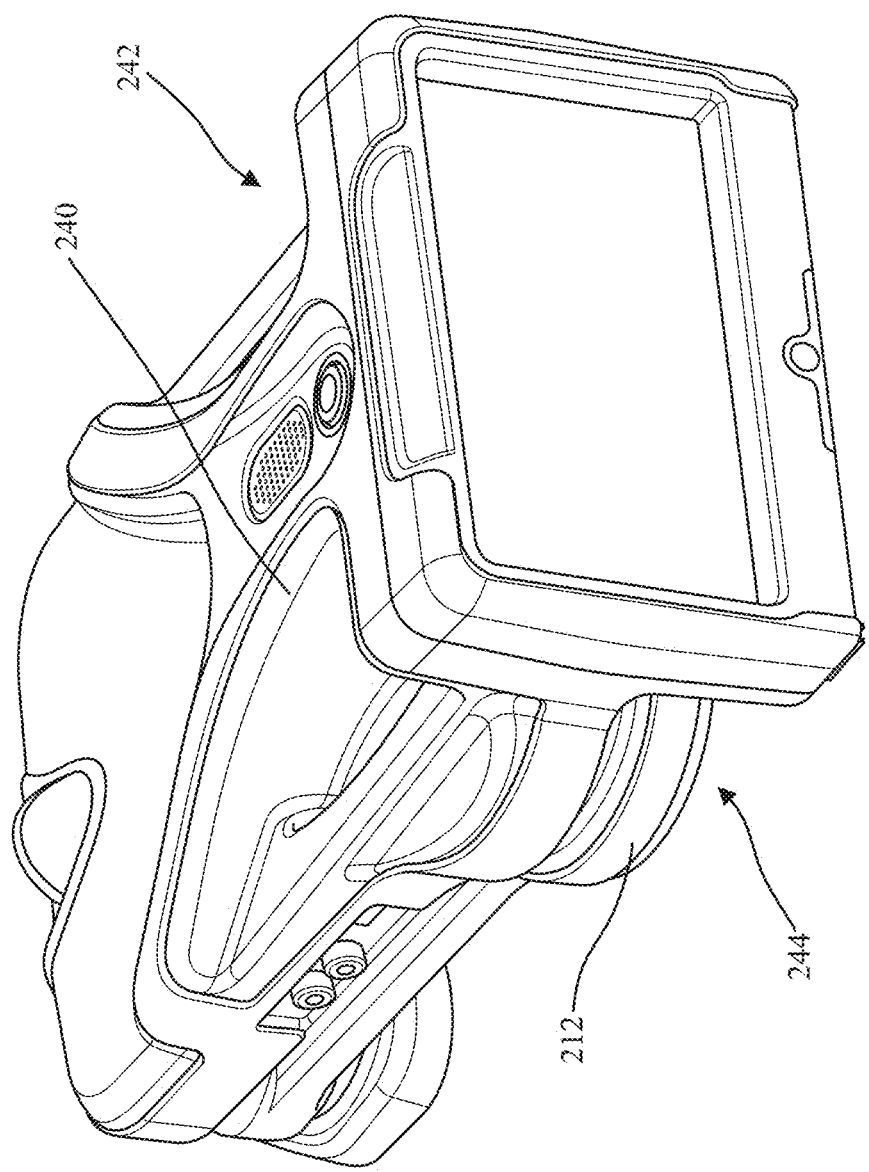

TRI-SEGMENTED BASELINE FOR GNSS BASED ANTENNA ALIGNMENT

BACKGROUND

Modern communication systems rely heavily on wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of received wireless signals to electrical currents carried through wires to the connected circuitry. Because of directional oscillation of electrical and magnetic fields, wireless signaling through the transmittal and receipt of electromagnetic fields is inherently directional: heavily influenced by the location of the signal source, multipathing, beamforming, and or other aspects associated with electromagnetic fields and electromagnetic radiation. Antenna alignment may therefore be desired for optimizing bandwidth, signal strength, and or other transmit/receive parameters. Antenna alignment may generally be performed using antenna alignment devices.

Global Navigation Satellite System (GNSS) technology has been used in antenna alignment devices. Particularly, multiple GNSS antennas (the GNSS antennas in the antenna alignment devices are not to be confused with an external antenna, e.g., a cellular antenna, being aligned) have been used to calculate corresponding multiple geolocations. The multiple geolocations may be used to calculate the azimuth of the antenna alignment device and hence the azimuth of the antenna itself. It is desirable to have the GNSS antennas as far apart as possible to increase the baseline (i.e., the distance between the GNSS receivers/antennas). Conventionally, long arms with GNSS antennas attached at the ends have been used. But the long arms have significant vulnerability to impact and wind shear effects, thereby increasing the likelihood of measurement errors. In addition, long arms are inherently unstable and prone to a mechanical break-off. Furthermore, due to their length, antenna alignment devices with long arms are cumbersome to store or carry to inconvenient locations such as antenna towers. Therefore, conventional solutions have not been satisfactory.

As such, a significant improvement upon the technology of increasing a baseline for GNSS antennas in antenna alignment devices is desired.

SUMMARY

Embodiments disclosed herein solve the aforementioned technical problems and provide other solutions as well. An example GNSS antenna alignment device may have two movably attached arms to a main housing of the antenna alignment device. Each arm may have a GNSS antenna (not to be confused with the antenna being aligned) mounted thereon. The baseline between the GNSS antennas therefore may be tri-segmented, with a first arm forming a first segment, a second arm forming a second segment, and the main housing forming a third segment. The length and orientation of the baseline may be adjusted by moving one or more of the first arm and the second arm. Furthermore, the first arm and the second arm may be stowed for a convenient storage and transport.

In an embodiment, a GNSS antenna alignment device with a tri-segmented baseline is provided. The tri-segmented baseline may include a first segment formed by a first arm attached to a main housing of the antenna alignment device, the first arm having a first GNSS antenna mounted thereon. The tri-segmented baseline may also include a second segment formed by a second arm attached to the main housing of the antenna alignment device, the second arm having a second GNSS antenna mounted thereon. The tri-segmented baseline may further include a third segment formed by the main housing of the antenna alignment device.

In an embodiment, a GNSS antenna alignment device with a tri-segmented baseline is provided. The tri-segmented baseline may include a first segment formed by a first arm attached to a main housing of the antenna alignment device, the first arm having a first GNSS receiver mounted thereon. The tri-segmented baseline may also include a second segment formed by a second arm attached to the main housing of the antenna alignment device, the second arm having a second GNSS receiver mounted thereon. The tri-segmented baseline may further include a third segment formed by the main housing of the antenna alignment device.

In yet another embodiment, a method of manufacturing a GNSS antenna alignment device with a tri-segmented baseline is provided. The method may include movably attaching a first arm having a first GNSS antenna mounted thereon to a main housing, the first arm forming a first segment of the tri-segmented baseline. The method may also include movably attaching a second arm having a second GNSS antenna mounted thereon to the main housing, the second arm forming a second segment of the tri-segmented baseline and the main housing forming a third segment of the tri-segmented baseline. The first arm may be adapted to move to a first set of discrete positions and the second arm may be adapted to move to a second set of discrete positions to change at least one of a length or orientation of the baseline.

BRIEF DESCRIPTION OF THE DRAWINGS

FIG. 2B shows a perspective view of the antenna alignment device of FIG. 2A with the movable arms in stowed positions.

It should be understood that these drawings are merely for explaining example embodiments and therefore are not limiting.

DETAILED DESCRIPTION OF SEVERAL EMBODIMENTS

For GNSS based antenna alignment devices, it is desirable to keep the GNSS antennas (not to be confused with the antenna being aligned) far apart to increase the length of the baseline. It is further desirable to change the orientation of the baseline vis-à-vis the main housing of the antenna alignment device. To address these needs, an example antenna alignment device may have a tri-segmented baseline, enabled by two movable arms, with GNSS antennas mounted thereon, attached to the main housing. In the tri-segmented baseline, the first movable arm may form a first segment, the second movable arm may form a second segment, and the main housing may form a third segment.

Figure 1:
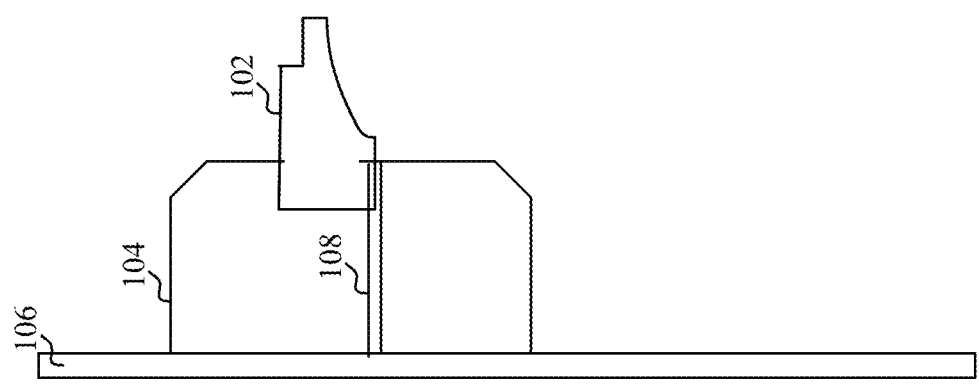
FIG. 1 shows an example antenna alignment environment based on the principles disclosed herein.

FIG. 1 shows an example antenna alignment (also referred to as antenna tuning) environment 100 based on the principles disclosed herein. The example environment 100 includes an antenna 104 (also referred to as an external antenna), which may be disposed on a pole 106. The pole 106 is just an example, and the antenna 104 may be located on any type of structure such as an antenna tower, rooftop, treetop, building wall, vehicle top, satellite, and/or any other type of structure. Furthermore, the antenna 104 can be any type of antenna, including a dome antenna, loop antenna, Yagi-type antenna, and or any type of antenna that may have to be aligned for optimal performance. Although the antenna 104 is described herein as a singular antenna, a combination of antennas that may have to be aligned should also be considered within the scope of this disclosure. The antenna 104 may use any kind of transmit/receive frequency, e.g., the antenna 104 may be a microwave antenna.

An antenna alignment device 102 may be attached to the antenna 104 using a coupler 108. The antenna alignment device 102 may include any type of sensors, displays, and/or other components configured to align (or tune) the antenna 104. When coupled to the antenna 104, the orientation of the antenna alignment device 102 may correspond to the orientation of the antenna 104. The alignment may be based on alignment parameters such as roll, pitch, or azimuth, as understood in the art.

In operation, the antenna alignment device 102 may use multiple GNSS antennas (not to be confused with the antenna 104 being aligned), each of which may use GNSS satellites to geolocate itself. The geolocation may be used for calculating latitude, longitude, and altitude of the corresponding GNSS antenna. Based on the calculated latitudes, longitudes, and the altitudes, the azimuth of the antenna 104 may be determined (e.g., based on a determined azimuth the antenna alignment device 102). The GNSS antennas may be placed on movable arms (as detailed below in the description corresponding to FIG. 2A). The movable arms may be used to change baseline (e.g., change the length of the baseline and or the orientation of the baseline vis-à-vis the housing of the antenna alignment device) of the GNSS antennas. Generally, the movable arms and the housing of the antenna alignment device may form a tri-segmented GNSS antenna: a first arm forming a first segment, a second arm forming a second segment, and the housing forming a third segment.

Figure 2A:
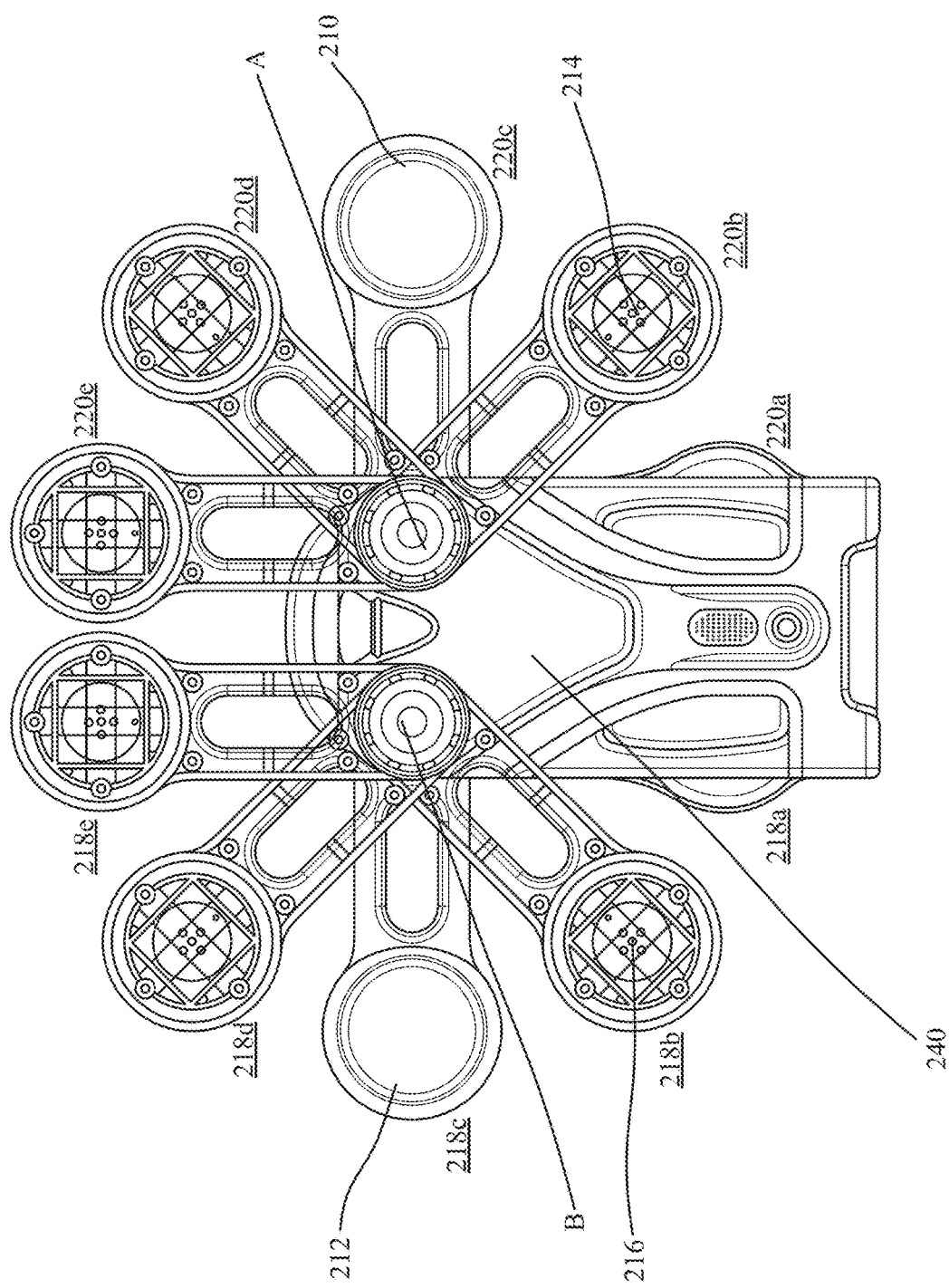
FIG. 2A shows an example antenna alignment device with movable arms containing GNSS antennas based on the principles disclosed herein.

FIG. 2A shows an example antenna alignment device 202 with movable arms containing GNSS antennas based on the principles disclosed herein. It should be understood that the shown configuration is merely an example, and antenna alignment devices with alternate configurations (e.g., containing less components or more components) should be considered within the scope of this disclosure.

As shown in FIG. 2A, the antenna alignment device 202 may include two movable arms 210, 212 movably connected to a housing 240 of the antenna alignment device 202 at points A and B, respectively. Within the first movable arm 210, there may be a first GNSS antenna 214 and within the second movable arm 212, there may be a second GNSS antenna 216. The first movable arm 210 may be moved to one of the multiple positions 220a-220e shown in the illustrated example, which may be discrete positions. The first position 220a may be a stowing position for the first movable arm 210. The second movable arm 212 may be moved to one of the multiple positions 218a-218e shown in the illustrated example, which may be discrete positions. The first position 218a may be a stowing position for the second movable arm 212. Each of the movable arms 210, 212 may be independently adjusted (or moved). The positions of the movable arms 210, 212 may be used to establish a baseline (e.g., distance between) for the GNSS antennas 214, 216. Furthermore, the positions of the movable arms 210, 212 may be used to establish an orientation of the baseline vis-à-vis the housing 240. Therefore, a tri-segmented GNSS antenna baseline may be realized, with the first movable arm 210 forming a first segment, the second movable arm 212 forming a second segment, and the housing 240 forming a third segment.

As shown, the baseline may be varied from the shortest distance, formed by a fifth position 220e of the first movable arm 210 and by a fifth position 218e of the second movable arm 212—to the largest distance formed by a third position 220c of the first movable arm 210 and a third position 218c of the second movable arm. The orientation of the baseline vis-à-vis the housing 240 may be changed as well. The third positions 220c, 218c of the movable arms 210, 212, respectively cause the baseline to be perpendicular to the housing 240. On the other hand, second position 220b of the first movable arm 210 and fourth position 218d of the second movable arm 212 cause the baseline to be oriented at an angle to the housing 240. As another example, the fifth positions 220e, 218e of the movable arms 210, 212, respectively cause the baseline to be away from the housing 240 in an axial direction.

The movable arms 210, 212 may be connected at points A, B of the housing 240 using a hinged connection. The connection may allow for relatively stable discrete positions 220a-220e for the first movable arm 210 and positions 218a-218e for the second movable arm 212. The discrete positions (or rest positions) 220a-220e, 218a-218e may be enabled by mechanical detents and or any other type of mechanical, magnetic, or electromechanical technology. The discrete positions 220a-220e, 218a-218e may make the movable arms 210, 212 more robustly hold their positions and be less prone to shifts due to e.g., impact and wind shear.

In some embodiments, a GNSS receiver (not shown) may be provided on the housing 240 of the antenna alignment device in addition to the GNSS antennas 214, 216. The GNSS receiver may be a single dual channel receiver, the GNSS antennas 214, 216 may correspond to each of the channels. Using the GNSS antennas 214, 216 may allow for a smaller physical form factor because each of the GNSS antennas 214, 216 may just need a single radio frequency (RF) cable in the corresponding arms 210, 212. In some embodiments, GNSS receivers may be used in the arms 210, 212 instead of GNSS antennas 214, 216. Therefore, different kinds of antenna alignment devices with either GNSS antennas or GNSS receivers at the movable arms should be considered within the scope of this disclosure.

FIG. 2B shows a perspective view of the antenna alignment device 202 with the movable arms 210 (obscured), 212 (shown) in stowed positions. In the illustrated example, the arms 210, 212 are respectively received within a receiving area 242, 244 of the housing 240. The stowed positions may be used for storing the antenna alignment device or when carrying it for deployment.

Figure 3:
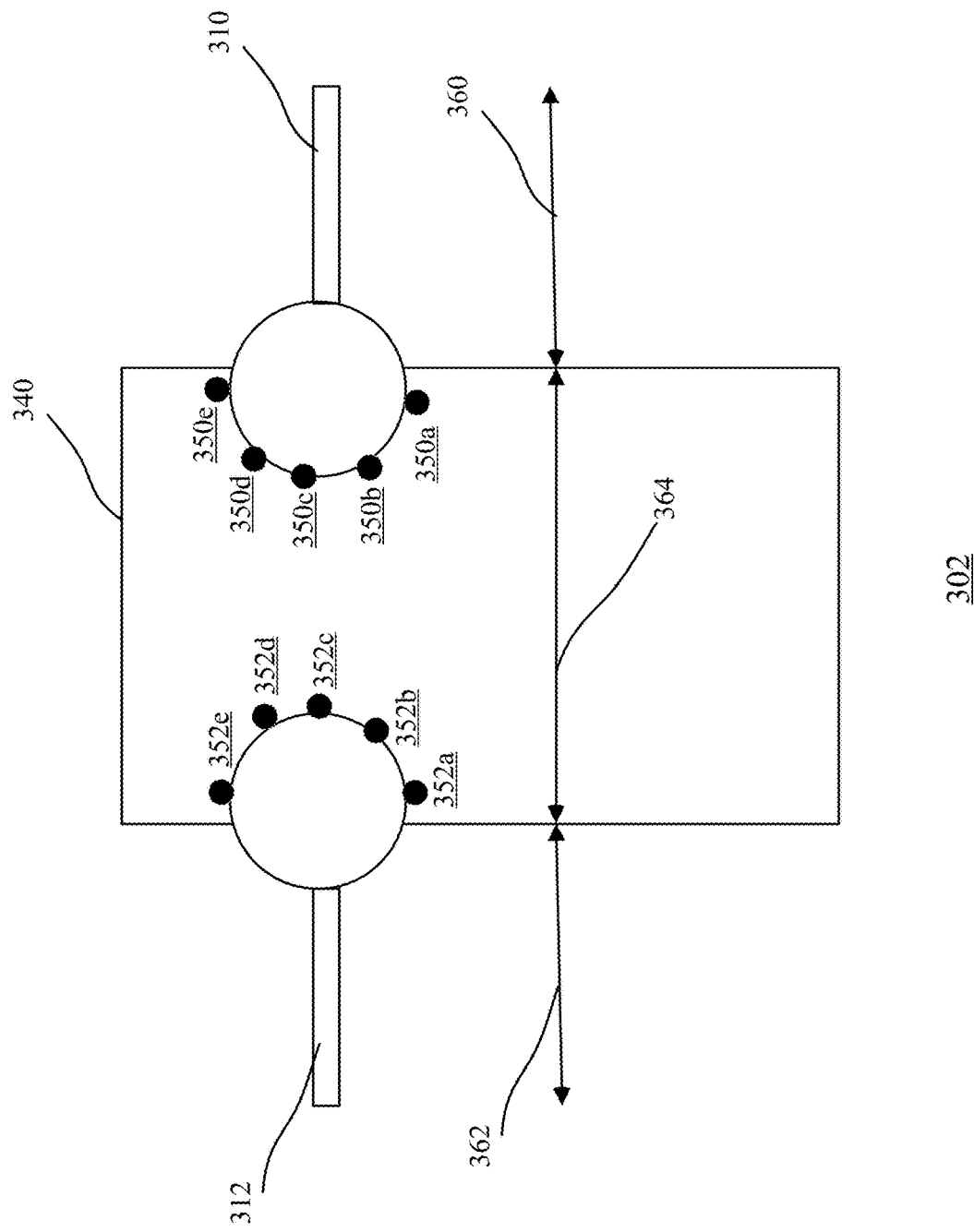
FIG. 3 shows a schematic view of an antenna alignment device based on the principles disclosed herein.

FIG. 3 shows a schematic view of an antenna alignment device 302 based on the principles disclosed herein. It should be understood that the schematic view shown in FIG. 3 and described herein is merely an example, and other types of antenna alignment devices with other types of configurations should also be considered within the scope of this disclosure.

As shown, there may be two movable arms 310, 312 on the antenna alignment device 302. Each movable arm 310, 312 is rotatably connected to the housing 340 of the antenna alignment device 302. To facilitate the discrete positions of each of the movable arms 310, 312, the housing 340 may have resting positions formed by mechanical detents and or any other type of mechanical, magnetic, or electromechanical features. For example, a first movable arm 310 may have five resting positions enabled by a first set of mechanical detents 350a-350e and a second movable arm 312 may also have five resting positions, enabled by a second set of mechanical detents 352a-352e. Using the mechanical detents 350a-350e, 352a-352e, the movable arms 310, 312 may be moved independently to establish a desired baseline for GNSS antennas (not shown) attached thereon. The movable arms 310, 312 and the housing 340 may form a tri-segmented GNSS antenna baseline: a first segment 360 formed by the first movable arm 310, a second segment 362 formed by the second movable arm 312, and a third segment formed by the housing 340. As described above in connection with FIG. 2A, different baselines for the GNSS antennas may be realized based on the different positions of the movable arms 310, 312.

Figure 4:
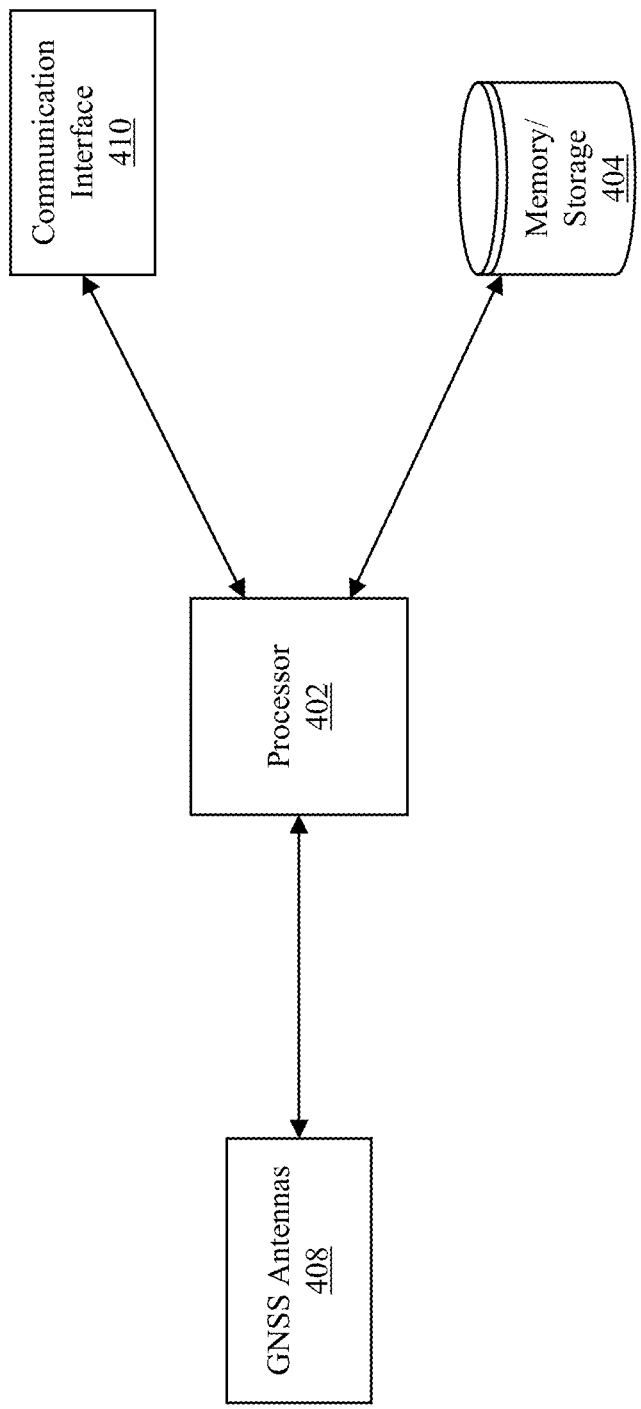
FIG. 4 shows an example architecture of an antenna alignment device based on the principles disclosed herein.

FIG. 4 shows an example architecture 400 of an antenna alignment device based on the principles disclosed herein. As shown, components in the architecture 400 may include, for example, a processor 402, a memory/storage device 404, GNSS antennas 408, and a communication interface 410. It should, however, be understood that these components are merely examples and architectures with additional, alternative, or fewer number of components should be considered within the scope of this disclosure. As described herein, the components forming the architecture 400 may be used by the antenna alignment device for calculating an azimuth of an external antenna based on the signals received by the GNSS antennas 408.

The processor 402 may include any kind of processing or control device that may command and control the several functionalities of the antenna alignment device. To that end, the processor 402 may execute instructions in the memory/storage device 404 to communicate with, provide instructions to, and receive data from the other components of the antenna alignment device. Some examples of the processor 402 may include a microprocessor, a system on a chip, an application specific integrated circuit (ASIC), a controller, or the like.

The memory/storage device 404 may include any kind of processor 402 readable storage medium. The memory/storage device 404 may store instructions for the processor 402 to execute and data gathered from the other components. The memory/storage device 404 should be understood to include any type of temporary or long-term storage. For instance, the memory/storage device 404 may include a random-access memory (RAM), a solid state drive, a hard drive, and or any other type of memory/storage technology.

The GNSS antennas 408 may communicate with GNSS satellites to calculate the corresponding geolocations of the GNSS antennas 408. More particularly, the GNSS antennas 408 may receive GNSS signals broadcasted by the GNSS satellites, and use the attributes of the signal (e.g., time of the broadcast embedded in the GNSS signals) to geolocate themselves. Geolocating may include determining latitude, longitude, altitude, and/or other attributes associated with determining the corresponding geolocations. When multiple GNSS antennas 408 determine their geolocations, the processor 402 may use these geolocations to determine alignment parameters of the antenna alignment device (and consequently the external antenna), such as its azimuth. For a better reception of the GNSS signals, the GNSS antennas 408 may have to be kept as far apart as possible, increasing the baseline. Furthermore, the orientation of the baseline vis-à-vis the housing of the antenna alignment device may have to be changed. The baseline adjustment may be performed using the embodiments disclosed herein.

The communication interface 410 may enable communication between the antenna alignment device and any type of processing device. For example, the communication interface 410 may enable wireless communications using protocols such as Bluetooth, WiFi, Zigbee, etc. to communicate with a nearby processing device. An example of the nearby processing device may include a mobile device (e.g., smartphone, tablet) being used by the technician. The communication interface 410 may provide data to the mobile device such that one or more alignment parameters may be displayed by the mobile device. For example, the mobile device may provide an alternative to or replicate a display in the antenna alignment device. The communication interface 410 may further enable wired communication between the antenna alignment device and processing devices such as laptop computer and desktop computers. Using the wired communication, alignment parameters and other data may be transferred to the processing devices.

Figure 5:
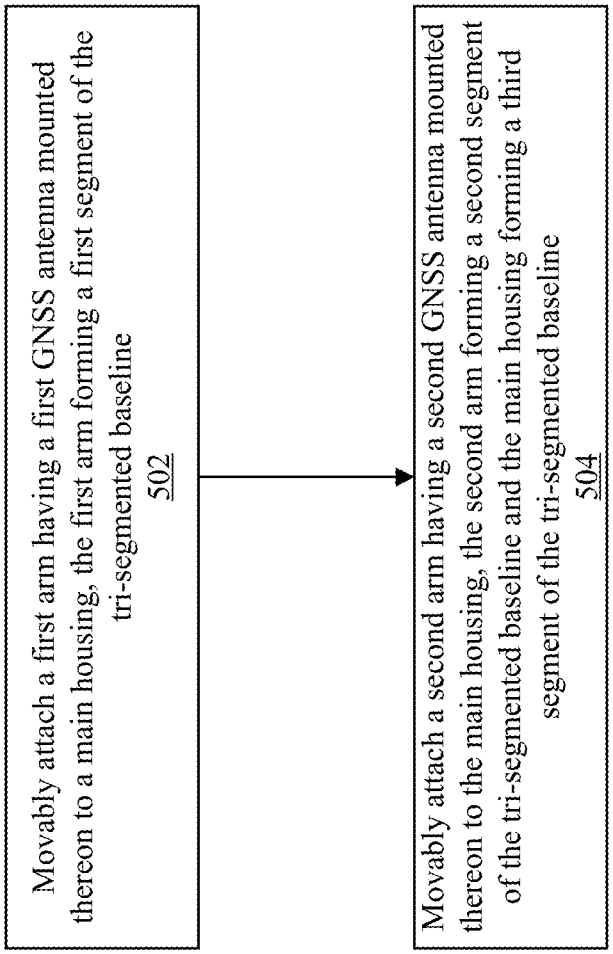
FIG. 5 shows a flow diagram of an example method of manufacturing an antenna alignment device based on the principles disclosed herein.

FIG. 5 shows a flow diagram of an example method 500 of manufacturing an antenna alignment device based on the principles disclosed herein. It should be understood that the steps shown in FIG. 5 and described herein are merely examples and methods with additional, alternative, or fewer number of steps should be considered within the scope of this disclosure. Using the method 500, a GNSS antenna alignment device with a tri-segmented baseline may be manufactured.

The method 500 may begin at step 502 where a first arm may be movably attached to a main housing of an antenna alignment device. The first arm may have a first GNSS antenna mounted thereon. Accordingly, the first arm may form a first segment of the tri-segmented baseline. At step 504, a second arm may be movably attached to the main housing. The second arm may have a second GNSS antenna mounted thereon. Accordingly, the second arm may form a second segment of the tri-segmented baseline and the main housing may form the third segment of the tri-segmented baseline. The first arm may be adapted to move to a first set of discrete positions and the second arm may be adapted to move to a second set of discrete positions to change at least one of a length or orientation of the tri-segmented baseline.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A global navigation satellite system (GNSS) antenna alignment device comprising:
    a tri-segmented baseline comprising:
        a first segment formed by a first arm attached to a main housing of the antenna alignment device, the first arm having a first GNSS antenna mounted thereon;
        a second segment formed by a second arm attached to the main housing of the antenna alignment device, the second arm having a second GNSS antenna mounted thereon, each of the first arm and the second arm being configured to be adjustable independently of each other in their corresponding non-stowed positions to vary a distance between the first and second GNSS antennas during deployment of the antenna alignment device; and
        a third segment formed by the main housing of the antenna alignment device.

2. The GNSS antenna alignment device of claim 1, wherein the first arm is configured to be movable to a first set of discrete positions.

3. The GNSS antenna alignment device of claim 2, wherein the first set of discrete positions is associated with a first set of mechanical detents configured to hold the first arm in corresponding positions.

4. The GNSS antenna alignment device of claim 1, wherein the second arm is configured to be movable to a second set of discrete positions.

5. The GNSS antenna alignment device of claim 4, wherein the second set of discrete positions is associated with a second set of mechanical detents configured to hold the second arm in corresponding positions.

6. The GNSS antenna alignment device of claim 1, wherein:
    the first arm is configured to be movable to a first set of discrete positions;
    the second arm is configured to be movable to a second set of discrete positions; and
    a first position among the first set of discrete positions and a second position among the second set of discrete positions are configured to be selected for the first arm and the second arm, respectively, based on a length of the baseline.

7. The GNSS antenna alignment device of claim 1, wherein:
    the first arm is configured to be movable to a first set of discrete positions;
    the second arm is configured to be movable to a second set of discrete positions; and
    a first position among the first set of discrete positions and a second position among the second set of discrete positions are configured to be selected for the first arm and the second arm, respectively, based on an orientation of the baseline.

8. The GNSS antenna alignment device of claim 1, wherein:
    the first arm is configured to be movable to a first set of discrete positions;
    the second arm is configured to be movable to a second set of discrete positions; and
    each of the first set of discrete positions and the second set of discrete positions includes a stowing position.

9. A global navigation satellite system (GNSS) antenna alignment device comprising:
    a tri-segmented baseline comprising:
        a first segment formed by a first arm attached to a main housing of the antenna alignment device, the first arm having a first GNSS receiver mounted thereon;
        a second segment formed by a second arm attached to the main housing of the antenna alignment device, the second arm having a second GNSS receiver mounted thereon, each of the first arm and the second arm being configured to be adjustable independently of each other in their corresponding non-stowed positions to vary a distance between the first and second GNSS antennas during deployment of the antenna alignment device; and
        a third segment formed by the main housing of the antenna alignment device.

10. The GNSS antenna alignment device of claim 9, wherein the first arm is configured to be movable to a first set of discrete positions.

11. The GNSS antenna alignment device of claim 10, wherein the first set of discrete positions is associated with a first set of mechanical detents configured to hold the first arm in corresponding positions.

12. The GNSS antenna alignment device of claim 9, wherein the second arm is configured to be movable to a second set of discrete positions.

13. The GNSS antenna alignment device of claim 12, wherein the second set of discrete positions is associated with a second set of mechanical detents configured to hold the second arm in corresponding positions.

14. The GNSS antenna alignment device of claim 9, wherein:
    the first arm is configured to be movable to a first set of discrete positions;
    the second arm is configured to be movable to a second set of discrete positions; and
    a first position among the first set of discrete positions and a second position among the second set of discrete positions are configured to be selected for the first arm and the second arm, respectively, based on a length of the baseline.

15. The GNSS antenna alignment device of claim 9, wherein:
    the first arm is configured to be movable to a first set of discrete positions;
    the second arm is configured to be movable to a second set of discrete positions; and
    a first position among the first set of discrete positions and a second position among the second set of discrete positions are configured to be selected for the first arm and the second arm, respectively, based on an orientation of the baseline.

16. The GNSS antenna alignment device of claim 9, wherein:
    the first arm is configured to be movable to a first set of discrete positions;
    the second arm is configured to be movable to a second set of discrete positions; and
    each of the first set of discrete positions and the second set of discrete positions includes a stowing position.

17. A method of manufacturing a global satellite system (GNSS) antenna alignment device with a tri-segmented baseline, the method comprising:

movably attaching a first arm having a first GNSS antenna mounted thereon to a main housing, the first arm forming a first segment of the tri-segmented baseline; and movably attaching a second arm having a second GNSS antenna mounted thereon to the main housing, the second arm forming a second segment of the tri-segmented baseline and the main housing forming a third segment of the tri-segmented baseline, wherein the first arm is adapted to move to a first set of discrete positions and the second arm is adapted to move to a second set of discrete positions to change at least one of a length or orientation of the baseline, each of the first arm and the second arm being adaptable to be adjustable independently of each other in their corresponding non-stowed positions to vary a distance between the first and second GNSS antennas during deployment of the antenna alignment device.

18. The method of claim 17, wherein the first set of discrete positions is associated with a first set of mechanical detents configured to hold the first arm in corresponding positions.

19. The method of claim 17, wherein the second set of discrete positions is associated with a second set of mechanical detents configured to hold the second arm in corresponding positions.

20. The method of claim 17, wherein each of first set of discrete positions and the second set of discrete positions includes a stowing position.

* * * * *